| (12) | United States Patent<br>Chen | (10) Patent No.: US 9,831,702 B2<br>(45) Date of Patent: Nov. 28, 2017 |
|---|---|---|

(54) COMPENSATION CIRCUIT AND ENERGY STORAGE DEVICE THEREOF

(71) Applicant: ANPEC ELECTRONICS CORPORATION, Hsinchu (TW)

(72) Inventor: Chih-Ning Chen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 105 days.

(21) Appl. No.: 15/073,608

(22) Filed: Mar. 17, 2016

(65) Prior Publication Data

US 2017/0126045 A1 May 4, 2017

(30) Foreign Application Priority Data

Oct. 28, 2015 (TW) .............................. 104135412 A

(51) Int. Cl.
*H02J 7/00* (2006.01)
(52) U.S. Cl.
CPC .......... *H02J 7/0081* (2013.01); *H02J 7/0057* (2013.01); *H02J 7/0021* (2013.01); *H02J 7/0036* (2013.01); *H02J 7/0052* (2013.01)
(58) Field of Classification Search
CPC .... H02J 7/04; H02J 7/007; H02J 7/008; H02J 7/0011; H02J 7/0021; H02J 7/0036; H02J 7/0052; H02J 7/0057; B60L 11/1611; B60L 11/1851; G06F 1/3212

USPC ......................... 320/134, 136, 143, 145, 149
See application file for complete search history.

(56) References Cited

U.S. PATENT DOCUMENTS

| 8,022,675 B2 * | 9/2011 | Moidron | .......... G01R 19/16538 |
| | | | 320/121 |
| 2010/0148730 A1 * | 6/2010 | Choi | .......... H02J 7/08 |
| | | | 320/145 |

* cited by examiner

*Primary Examiner* — Paul Dinh
(74) *Attorney, Agent, or Firm* — Li & Cai Intellectual Property (USA) Office

(57) ABSTRACT

The present disclosure illustrates a compensation circuit of an energy storage device. The compensation circuit includes a first error amplifier, a switching unit, a first RC network, a voltage recording module and a logic control module. The switching unit selectively connects an output end, a first input end of the first error amplifier or the voltage output end. A resistance value or a capacitance value of the first RC network changes with different sensing loops of the energy storage device. When the energy storage device switches the sensing loop, a detection circuit outputs a detecting signal. The logic control module controls the switching unit to connect the first input end to the output end, and controls the voltage recording module to output a preset output voltage to the voltage output end for stabilizing a first capacitor of the first RC network.

20 Claims, 6 Drawing Sheets

COMPENSATION CIRCUIT AND ENERGY STORAGE DEVICE THEREOF

BACKGROUND OF THE INVENTION

1. Field of the Invention

The instant disclosure relates to a compensation circuit; in particular, to a compensation circuit that can adjust the response time, and an energy storage device using the same.

2. Description of Related Art

With the development of technology, the portable electric device has become an essential tool in our lives, such as mobile phones, tablets, music players or video players having a USB transmission interface.

The power is consumed quickly for the portable electric device, so the user would usually have an energy storage device, such as a power bank, to charge the portable energy storage device. The energy storage devices generally have the OTG (On the Go) function. In other words, the energy storage device can be viewed as a peripheral equipment that receives energy from other devices, such as a computer. The energy storage device can also be a host device to charge the slave electric devices. In addition, recently, an energy storage device has come up, which can be charged by the outside electric energy and can charge the slave electric devices simultaneously.

Usually, there would be a detection circuit and a compensation circuit in an energy storage device. The compensation circuit comprises a plurality of amplifiers, comparators, resistors and capacitors. The detection circuit comprises a plurality of sensing loops to detect the voltage and the current of the energy storage device. For example, the detection circuit can detect the input voltage and the input current generated by the outside electric energy, or the output voltage and the output current provided by the battery of the energy storage device. The compensation circuit is configured to provide the compensation to each sensing loop to respond with the load needed by the portable electric device.

However, in the traditional compensation circuit, the resistance and the capacitance are both fixed, so the compensation circuit can only provide one compensation value. In other words, the response time of each sensing loop responding to the load change of the electric device is constant, wherein the response time refers to the time from the timing when the load of the portable electric device changes to the timing when the energy storage device correspondingly starts to support energy. Thus, the traditional compensation circuit cannot provide different compensation values with respect to the detecting result of each sensing loop, and the response time of the energy storage device cannot be shortened.

SUMMARY OF THE INVENTION

The instant disclosure provides a compensation circuit used in an energy storage device. The energy storage device is configured to charge an electric device. The compensation circuit comprises a first error amplifier, a first switching unit, a first RC network, a voltage recording module, a second switching unit and a logic control module. The first error amplifier has a first input end electrically connected to a detection circuit, wherein the detection circuit detects a plurality of sensing loops of the electric device. The first switching unit is electrically connected to an output end of the first error amplifier, the first input end of the first error amplifier and a voltage output end, to selectively make the output end of the first error amplifier, the first input end of the first error amplifier and the voltage output end connected. The first RC network is electrically connected to the first input end of the first error amplifier and the voltage output end, wherein the first RC network comprises a first capacitor. The resistance or the capacitance of the first RC network changes with different sensing loops to change a compensation value of the compensation circuit. The voltage recording module is electrically connected to the voltage output end, to provide a preset output voltage. The second switching unit is electrically connected between the voltage output end and the voltage recording module, to selectively make the voltage output end and the voltage recording module connected. The logic control module is electrically connected to the first switching unit, the second switching unit and the voltage recording module. The detection circuit outputs a detecting signal as the sensing loop changes, such that the logic control module controls the first switching unit to make the first input end of the first error amplifier and the output end of the first error amplifier connected and controls the second switching unit to make the voltage output end and the voltage recording module connected according to the detecting signal. The voltage recording module outputs the preset output voltage to the voltage output end to stabilize the voltage of the first capacitor. After receiving the detecting signal, the compensation circuit switches to a voltage regulation mode, and the voltage output by the first error amplifier is fed back to the first input end of the first error amplifier, such that the voltage difference between a first input voltage of the first input end and a first reference voltage received by a second input end of the first error amplifier is within a preset range.

The instant disclosure further provides an energy storage device used to charge an electric device. The energy storage device comprises a detection circuit, an energy storage unit and a compensation circuit. The detection circuit detects a plurality of sensing loops and is used for determining different sensing loops. The energy storage unit is electrically connected to the detection circuit to store energy or provide energy. The compensation circuit is electrically connected to the detection circuit to provide a compensation value. The compensation circuit comprises a first error amplifier, a first switching unit, a first RC network, a voltage recording module, a second switching unit and a logic control module. The first error amplifier has a first input end electrically connected to the detection circuit. The first switching unit is electrically connected to an output end of the first error amplifier, the first input end of the first error amplifier and the voltage output end, to selectively make the output end of the first error amplifier, the first input end of the first error amplifier and the voltage output end connected. The first RC network is electrically connected to the first input end of the first error amplifier and the voltage output end, wherein the first RC network comprises a first capacitor. The resistance or the capacitance of the first RC network changes with different sensing loops to change a compensation value of the compensation circuit. The voltage recording module is electrically connected to the voltage output end to provide a preset output voltage. The second switching unit is electrically connected between the voltage output end and the voltage recording module, to selectively make the voltage output end and the voltage recording module connected. The logic control module is electrically connected to the first switching unit, the second switching unit and the voltage recording module. The detection circuit outputs a detecting signal as the sensing loop changes, such that the logic control module controls the first switching unit to make the first input end of the first error amplifier and the output end of the first error amplifier connected and controls the second switching unit to make the voltage output end and the voltage recording module connected according to the detecting signal. The voltage recording module outputs the preset output voltage to the voltage output end to stabilize the voltage of the first capacitor. After receiving the detecting signal, the compensation circuit switches to a voltage regulation mode, and the voltage output by the first error amplifier is fed back to the first input end of the first error amplifier, such that the voltage difference between a first input voltage of the first input end and a first reference voltage received by a second input end of the first error amplifier is within a preset range.

To sum up, the compensation circuit and the energy storage device using the same provided by the instant disclosure can provide different compensation values via changing the resistance or the capacitance in the compensation circuit. The response time of the energy storage device can be shortened because of the change of the compensation value, such that the loading change of the electric device can be supported quickly.

For further understanding of the instant disclosure, reference is made to the following detailed description illustrating the embodiments and embodiments of the instant disclosure. The description is only for illustrating the instant the disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, but these elements should not be limited by these terms. These terms are only to distinguish one element from another region or section discussed below and could be termed a second element without departing from the teachings of the instant disclosure. As used herein, the term "and/or" includes any and all combinations of one or more of the associated listed items.

Figure 1:
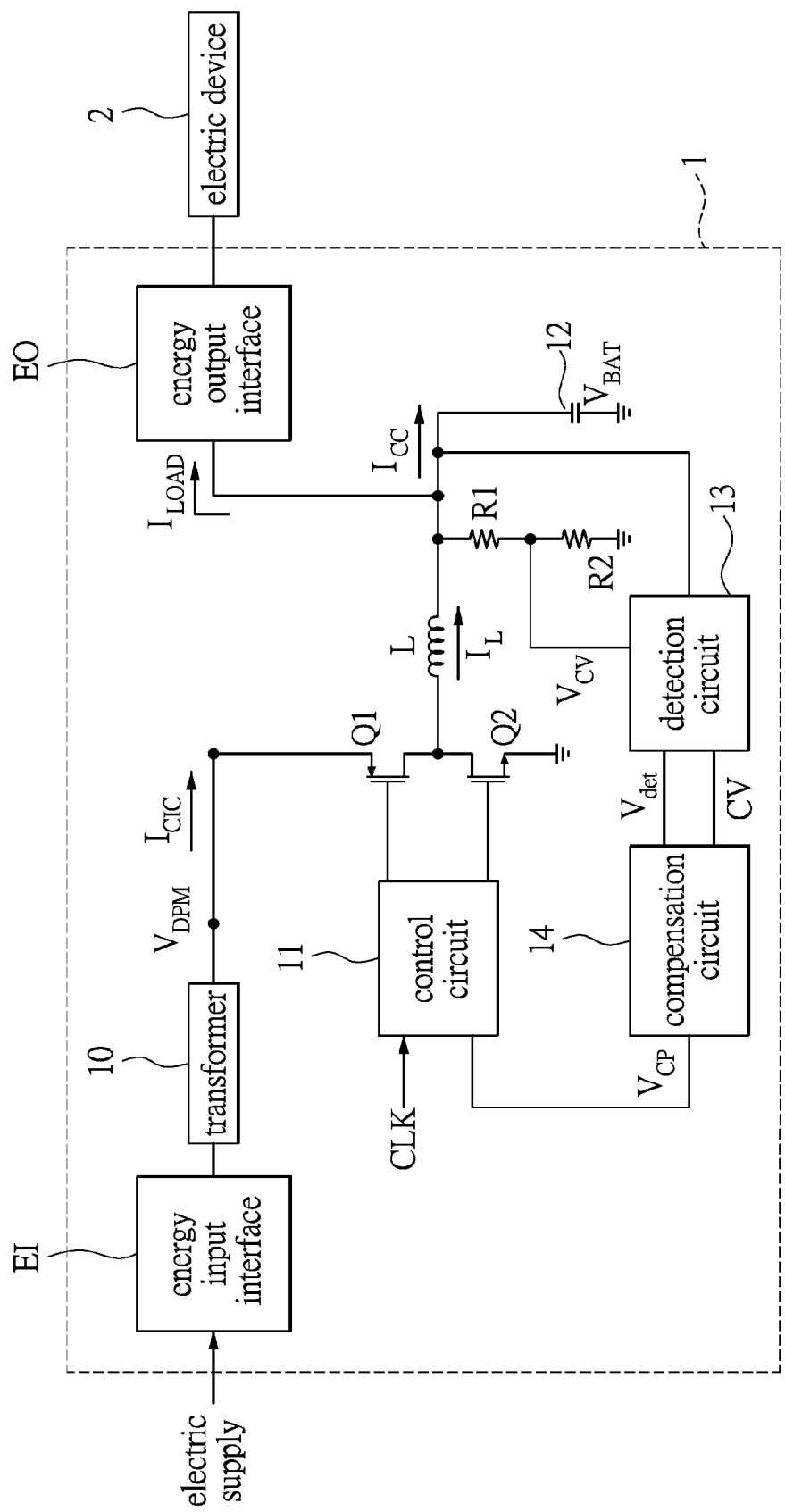
FIG. 1 shows a schematic diagram of an energy storage device of one embodiment of the instant disclosure.

Please refer to FIG. 1. FIG. 1 shows a schematic diagram of an energy storage device of one embodiment of the instant disclosure. The energy storage device 1 comprises at least an energy input interface EI, a transformer 10, a control circuit 11, an energy storage unit, a detection circuit 13, a compensation circuit 14, a first transistor Q1, a second transistor Q2, an inductor L, a first voltage division resistor R1, a second voltage division resistor R2 and at least an energy output interface EO. The transformer 10 is electrically connected to the energy input interface EI and the first transistor Q1. The first transistor Q1 is electrically connected to the second transistor Q2 and the inductor L. The inductor L is electrically connected to the first voltage division resistor R1. One end of the second voltage division resistor R2 is electrically connected to the detection circuit 13 and the first voltage division resistor R1, another end of the second voltage division resistor R2 is grounded. One end of the energy storage unit 12 is electrically connected to the first voltage division resistor R1, the detection circuit 13 and the energy output interface EO, and another end of the energy storage unit 12 is grounded. The detection circuit 13 is electrically connected to the compensation circuit 14. The compensation circuit 14 is electrically connected to the control circuit 11. The control circuit 11 is electrically connected to the gates of the first transistor Q1 and the second transistor Q2.

In addition, the electric device 2 is electrically connected to the energy output interface EO. The energy storage device 1 can be a power bank having OTG (On the Go) function, for example. In other words, the energy storage device 1 can receive an outside electric supply, convert it into electric energy and store the electric energy. The energy storage device 1 can also provide electric energy to other electric devices.

The electric device 2 can be an electric device having USB transmission interface, such as mobile phones, tablets, music players or video players, and it is not limited herein.

The energy input interface EI is configured to receive and transmit the outside electric supply to the transformer 10. In addition, in this embodiment, the energy storage device 1 only comprises one energy input interface; however, it is not limited herein. In another embodiment, the energy storage device 1 can comprise a plurality of energy input interfaces EI. In other words, the energy storage device 1 can be charged more quickly via these energy input interfaces EI. For the convenience of illustrating, the energy storage device 1 has only one energy input interface EI in the following description.

The stored electric energy of the energy storage device 1 is transmitted to the corresponding electric device 2 via the energy output interface EO, such as a USB transmission interface. In this embodiment, the energy storage device 1 only comprises one energy output interface EO; however, it is not limited herein. In other embodiments, the energy storage device 1 can also have a plurality of energy output interfaces EO. Each energy output interface EO is electrically connected to an electric device. That is, the energy storage device 1 can charge a plurality of electric device 2 via several energy output interfaces simultaneously. For the convenience of illustrating, the energy storage device 1 has only one energy output interface EO in the following description.

The transformer 10 comprises proper logics, circuits and/or codes, configured to increase or decrease the outside electric energy based on the Faraday's law of electromagnetic induction, and to generate an input current $I_{CIC}$ and an output voltage $V_{DPM}$.

The energy storage unit 12 can be a battery, which can store the received energy or can convert the stored energy into the electric energy that can be used by the electric device 2.

The first transistor Q1 can be a PMOS transistor, having the source electrically connected to the transformer 10, and the drain electrically connected to the second transistor Q2 and the inductor L. The second transistor Q2 can be an NMOS transistor, having the source grounded, and the drain electrically connected to the drain of the first transistor Q1 and the inductor L.

The detection circuit 13 is configured to detect the output current $I_{CC}$ flowing through the energy storage unit 12, and to detect the output voltage $V_{CV}$ of the energy storage unit 12, wherein the magnitude of the output voltage $V_{CV}$ is related to a ratio of the first voltage division resistor and the second voltage division resistor. In addition, the detection circuit 13 is electrically connected to the transformer 10 to detect the input current $I_{CIC}$ and the input voltage $V_{DPM}$ output by the transformer 10. The detection circuit 13 outputs a first detecting signal $V_{det}$ and a second detecting signal CV according to the detected output current $I_{CC}$, the output voltage $V_{CV}$, the input current $I_{CIC}$ and the input voltage $V_{DPM}$. The compensation circuit 14 is configured to correspondingly adjust the inside resistance and capacitance according to the first detecting signal $V_{det}$ and the second detecting signal CV, and to generate a compensation signal $V_{CP}$. The compensation signal $V_{CP}$ comprises the current compensation signal, and the compensation signal is related to the response time of the energy storage device 1. The response time refers to the time from the timing when the load of the electric device 2 changes to the timing when the energy storage device 1 correspondingly starts to support energy.

The control circuit 11 comprises proper logics, circuits and/or codes, configured to output PWM signals according to the compensation signal $V_{CP}$ and the clock signal CLK, to control the turning on and off of the first transistor Q1 and the second transistor Q2. In other words, the control circuit 11 can control the duty cycles of the first transistor Q1 and the second transistor Q2, so as to adjust the output current $I_{CC}$ flowing through the energy storage unit 12.

According to the above, the compensation circuit 14 in this embodiment can generate different compensation values in different situations. The control circuit 11 can shorten the response time of the energy storage device 1 according to the compensation values generated by the compensation circuit, so as to quickly respond to the load change of the electric device 2.

Figure 2A:
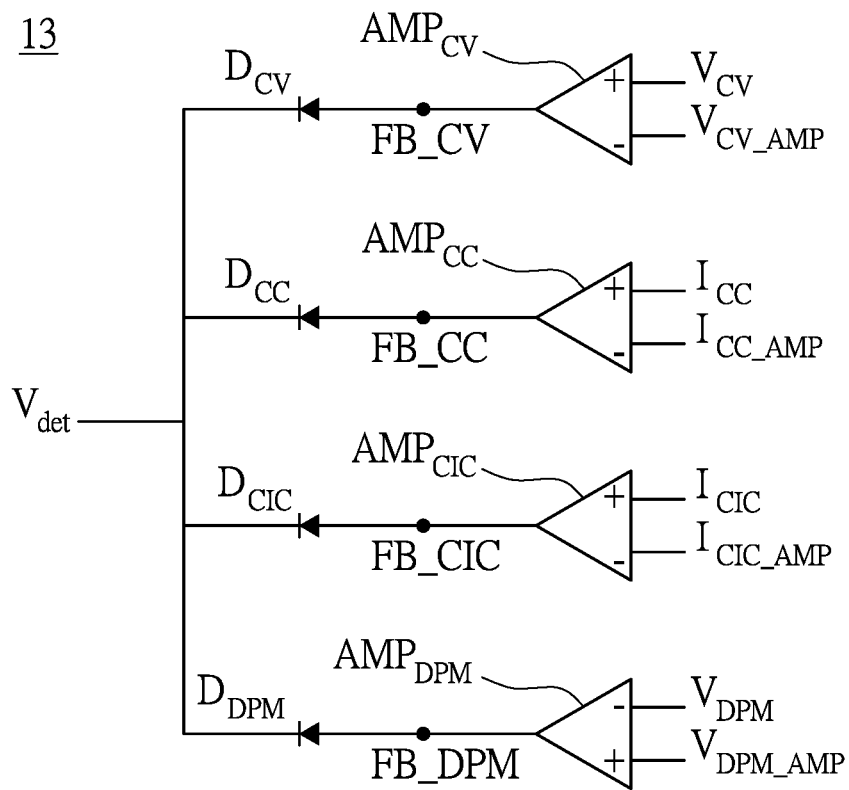
FIG. 2A shows a schematic diagram of an amplifier module of one embodiment of the instant disclosure.
Figure 2B:
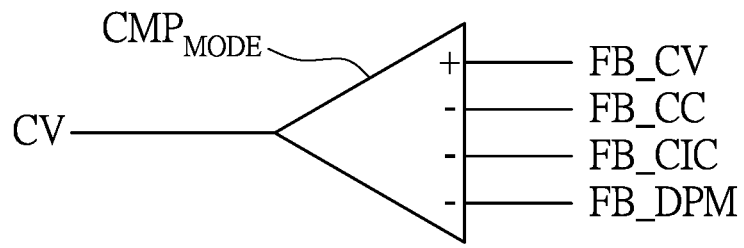
FIG. 2B shows a schematic diagram of a voltage comparator of one embodiment of the instant disclosure.

The following description further illustrates the structure and the working principle of the detection circuit 13. The detection circuit 13 comprises an amplifier module and a voltage comparator $CMP_{MODE}$. Please refer to FIG. 2A and FIG. 2B. FIG. 2A shows a schematic diagram of an amplifier module of one embodiment of the instant disclosure, and FIG. 2B shows a schematic diagram of a voltage comparator of one embodiment of the instant disclosure. The amplifier module comprises an output voltage amplifier $AMP_{CV}$, an output current amplifier $AMP_{CC}$, an input current amplifier $AMP_{CIC}$, an input voltage amplifier $AMP_{DPM}$, a first diode $D_{CV}$, a second diode $D_{CC}$, a third diode $D_{CIC}$ and a fourth diode $D_{DPM}$.

The non-inverting input end of the output voltage amplifier $AMP_{CV}$ is electrically connected between the first voltage division resistor R1 (shown in FIG. 1) and the second voltage division resistor R2 (shown in FIG. 1), which forms a sensing loop to detect the output voltage $V_{CV}$ and output the first output signal FB_CV. The inverting input end of the output voltage amplifier $AMP_{CV}$ receives a first comparison voltage $V_{CV\_AMP}$. The output end of the output voltage amplifier $AMP_{CV}$ is electrically connected to the anode of the first diode $D_{CV}$. The cathode of the first diode $D_{CV}$ is electrically connected to the compensation circuit 14 shown in FIG. 1.

The non-inverting end of the output current amplifier $AMP_{CC}$ is electrically connected to the energy storage unit 12 (shown in FIG. 1), which forms a sensing loop to detect the output current $I_{CC}$ and output a second output signal FB_CC. The inverting input end of the output current amplifier $AMP_{CC}$ receives the first comparison current $I_{CC\_AMP}$. The output end of the output current amplifier $AMP_{CC}$ is electrically connected to the anode of the second diode $D_{CC}$, and the cathode of the second diode $D_{CC}$ is electrically connected to the compensation circuit 14 shown in FIG. 1.

The non-inverting input end of the input current amplifier $AMP_{CIC}$ is electrically connected to the transformer 10 (shown in FIG. 1), which forms a sensing loop to detect the input current $I_{CIC}$ and output a third output signal FB_CIC. The inverting input end of the input current amplifier $AMP_{CIC}$ receives the second comparison current $I_{CIC\_AMP}$. The output end of the input current amplifier $AMP_{CIC}$ is electrically connected to the anode of the third diode $D_{CIC}$, and the cathode of the third diode $D_{CIC}$ is electrically connected to the compensation circuit 14 shown in FIG. 1.

The non-inverting input end of the input voltage amplifier $AMP_{DPM}$ is electrically connected to the transformer 10 (shown in FIG. 1), which forms a sensing loop to detect the input voltage $V_{DPM}$ and output a fourth output signal FB_DPM. The inverting input end of the input voltage amplifier $AMP_{DPM}$ receives the second comparison voltage $V_{DPM\_AMP}$. The output end of the input voltage amplifier $AMP_{DPM}$ is electrically connected to the anode of the fourth diode $D_{DPM}$, and the cathode of the fourth diode $D_{DPM}$ is electrically connected to the compensation circuit 14 shown in FIG. 1.

The detection circuit 13 outputs the first detecting signal $V_{det}$ to the compensation circuit 14 according to the detected output voltage $V_{CV}$, the output current $I_{CC}$, the input current $I_{CIC}$ and the input voltage $V_{DPM}$.

The input end of the voltage comparator $CMP_{MODE}$ detects the first output signal FB_CV, the second output signal FB_CC, the third output signal FB_CIC and the fourth output signal FB_DPM respectively, and outputs a second detecting signal CV to the compensation circuit 14. The compensation circuit 14 switches to different compensation values according to the first detecting signal $V_{det}$ and the second detecting signal CV, when the second detecting signal CV output by the voltage comparator $CMP_{MODE}$ is at high level.

It is worth mentioning that, in this embodiment, the non-inverting input end of the voltage comparator $CMP_{MODE}$ receives the first output signal FB_CV, and the inverting input ends of the voltage comparator $CMP_{MODE}$ receive the second output signal FB_CC, the third output signal FB_CIC and the fourth output signal FB_DPM; however, it is not limited herein. In other embodiments, the non-inverting input end of the voltage comparator $CMP_{MODE}$ can also receive one of the second output signal FB_CC, the third output signal FB_CIC and the fourth output signal FB_DPM, and the inverting input ends of the voltage comparator $CMP_{MODE}$ receive the left output signals.

Figure 3:
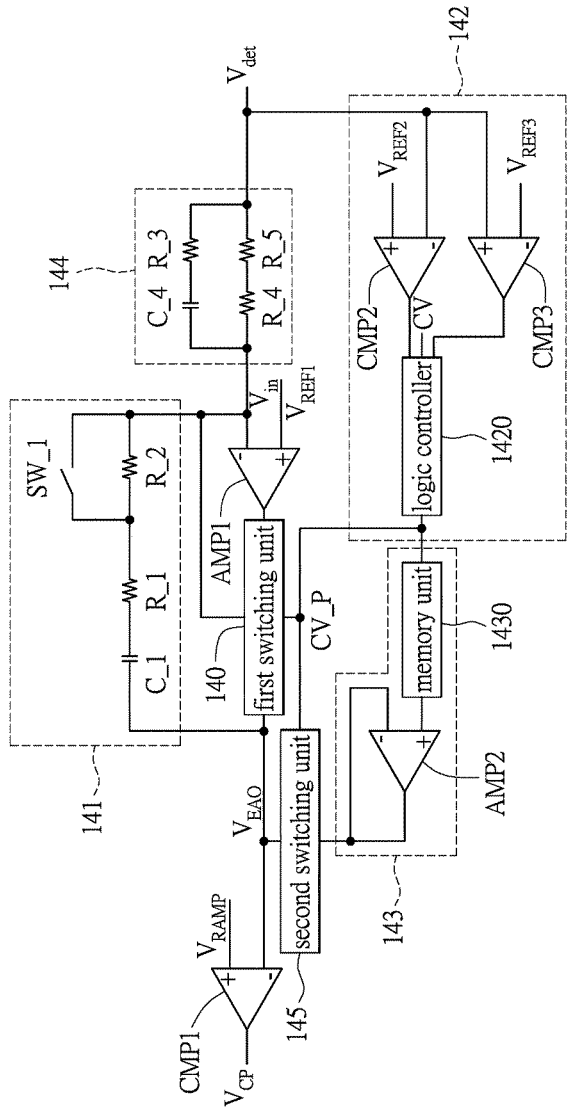
FIG. 3 shows a schematic diagram of a compensation circuit of one embodiment of the instant disclosure.

The following description further illustrates the structure and the working principle of the compensation circuit 14. Please refer to FIG. 3. FIG. 3 shows a schematic diagram of a compensation circuit of one embodiment of the instant disclosure. The compensation circuit 14 comprises a first error amplifier AMP1, a first switching unit 140, a first RC network 141, a logic control module 142, a voltage recording module 143, a second RC network 144, a first comparator CMP1 and a second switching unit 145. The inverting input end of the first error amplifier AMP1 is electrically connected to the second RC network 144 to receive the first input voltage $V_{in}$. The non-inverting input end of the first error amplifier AMP1 receives the first reference voltage $V_{REF1}$. The second RC network 144 is electrically connected to the above mentioned detection circuit 13. The first switching unit 140 is electrically connected to the output end of the first error amplifier AMP1, the inverting input end of the first error amplifier AMP1 and the voltage output end $V_{EAO}$. The first RC network 141 is electrically connected to the inverting input end of the first error amplifier AMP1 and the voltage output end $V_{EAO}$.

The logic control module 142 is electrically connected to the above mentioned detection circuit 13, the first switching unit 140 and the second switching unit 145. The voltage recording module 143 is electrically connected to the logic control module 142 and the second switching unit 145. The second switching unit 145 is electrically connected to the voltage output end $V_{EAO}$. The non-inverting input end of the first comparator CMP1 receives a ramp signal $V_{RAMP}$. The inverting input end of the first comparator CMP1 is electrically connected to the voltage output end $V_{EAO}$. The output end of the first comparator CMP1 is electrically connected to the above mentioned control circuit 11.

The first switching unit 140 comprises proper logics, circuits and/or codes, configured to selectively make the output end of the first error amplifier AMP1, and the inverting input end of the first error amplifier AMP1 or the voltage output end $V_{EAO}$ connected. The second switching unit 145 comprises proper logics, circuits and/or codes, configured to selectively make the voltage recording module 143 and the voltage output end $V_{EAO}$ connected.

The first RC network 141 comprises a first capacitor C_1, a first resistor R_1, a second resistor R_2 and a first switch SW_1. A first end of the first capacitor C_1 is electrically connected to the voltage output end $V_{EAO}$, and a second end of the first capacitor C_1 is electrically connected to the first resistor R_1. The first resistor R_1 is electrically connected to the second resistor R_2. The second resistor R_2 is electrically connected to the inverting input end of the first error amplifier AMP1. The first switch SW_1 is electrically connected to two ends of the second resistor R_2. It is worth mentioning that, the resistance and the capacitance of the first RC network 141 are related to the compensation value that the compensation circuit 14 provides to the control circuit 11.

The second RC network 144 comprises a fourth capacitor C_4, a third resistor R_3, a fourth resistor R_4 and a fifth resistor R_5. The fourth capacitor C_4 is electrically connected to the third resistor R_3 and the fourth resistor R_4. The third resistor R_3 is electrically connected to the fifth resistor R_5. The fourth resistor R_4 is electrically connected to the fifth resistor R_5 and the inverting input end of the first error amplifier AMP1. The fifth resistor R_5 is electrically connected to the detection circuit 13.

The logic control module 142 comprises a second comparator CMP2, a third comparator CMP3 and a logic controller 1420. The non-inverting input end of the second comparator CMP2 receives a second reference voltage $V_{REF2}$, wherein the magnitude of the reference voltage $V_{REF2}$ is 90% of the first reference voltage. The inverting input end of the second comparator CMP2 is electrically connected to the detection circuit 13. The non-inverting input end of the third comparator CMP3 is electrically connected to the detection circuit 13. The inverting input end of the third comparator CMP3 receives a reference voltage $V_{REF3}$, wherein the reference voltage $V_{REF3}$ is 110% of the first reference voltage $V_{REF1}$.

The logic controller 1420 is electrically connected to the output ends of the second comparator CMP2 and the third comparator CMP3 and the above mentioned voltage comparator $CMP_{MODE}$. In addition, the logic controller 1420 is also electrically connected to the first switching unit 140, the second switching unit 145 and the voltage recording module 143, to output the logic control signal CV_P according to comparison results of the second comparator CMP2 and the third comparator CMP3 and according to the second detecting signal CV, so as to control the first switching unit 140, the second switching unit 145A and the memory unit 1430.

The voltage recording module 143 comprises a second error amplifier AMP2 and the memory unit 1430. The inverting input end of the second error amplifier AMP2 is electrically connected to the output end of the second error amplifier AMP2 and the second switching unit 145. The non-inverting input end of the second error amplifier AMP2 is electrically connected to the memory unit 1430. The memory unit 1430 is electrically connected to the logic controller 1420 to store the preset output voltage, wherein the preset output voltage equals to the voltage corresponding to the voltage output end $V_{EAO}$ before the compensation circuit 14 changes the compensation value of the first RC network 141.

Figure 4:
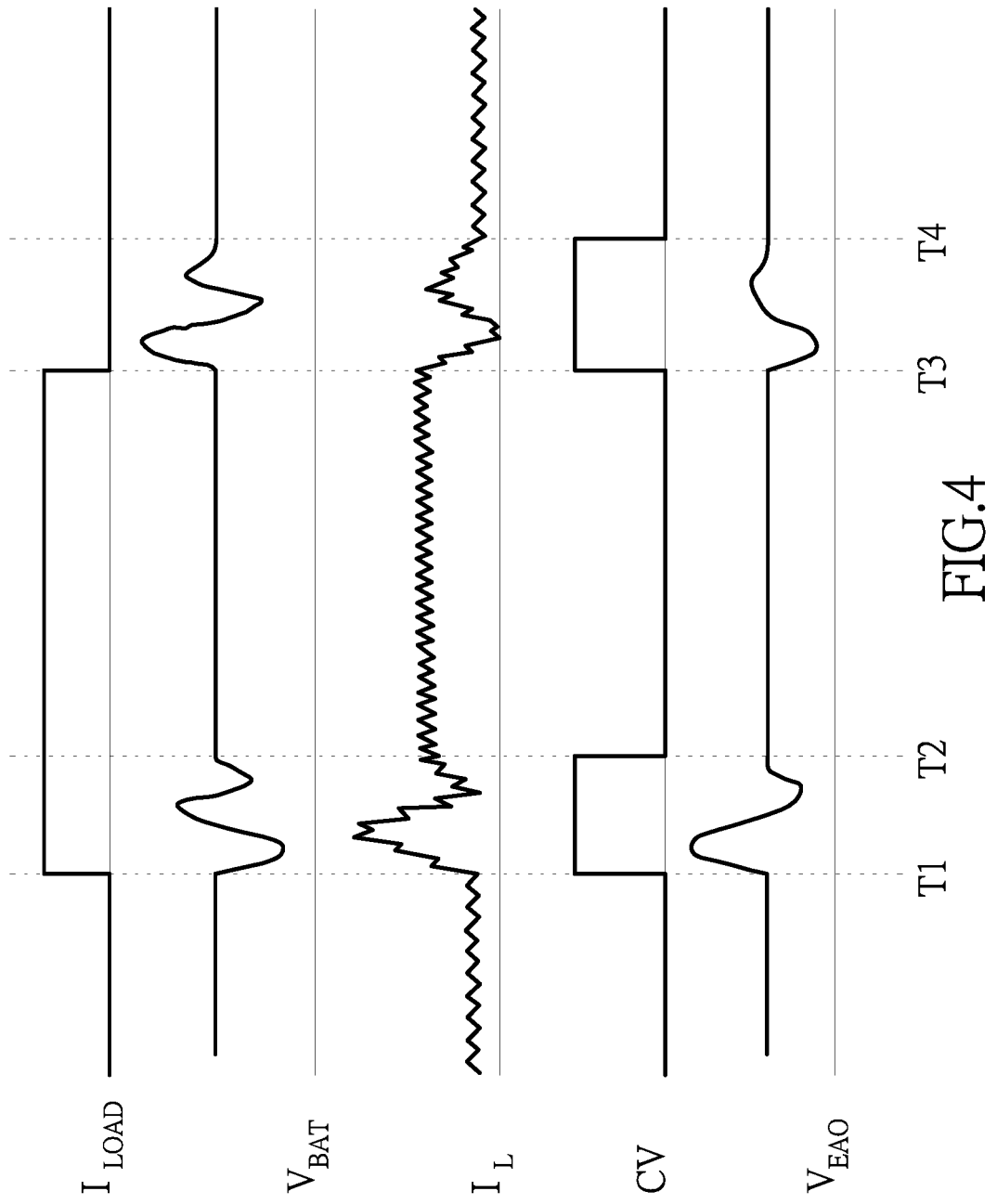
FIG. 4 shows waveform diagrams of the voltage and the current of an energy storage device of one embodiment of the instant disclosure.

For the convenience of illustrating the operation of the energy storage device 1, please refer to FIG. 4. FIG. 4 shows waveform diagrams of the voltage and the current of an energy storage device of one embodiment of the instant disclosure. The waveforms provided in FIG. 4 respectively represent the load current $I_{LOAD}$ provided to the electric device 2, the voltage stored in the energy storage unit $V_{BAT}$, the second detecting signal CV output by the voltage comparator $CMP_{MODE}$, the voltage of the voltage output end $V_{EAO}$ and the inductor current $I_L$ flowing through the inductor L. The load current $I_{LOAD}$ changes with the load of the electric device 2.

At the time T1, the load of the electric device 2 increases. To satisfy the load of the electric device 2, the energy storage unit 12 provides a required current to the load current $I_{LOAD}$, which results in a decrease of the output current $I_{CC}$. After that, the output current $I_{CC}$ decreases, so the output current amplifier $AMP_{CC}$ of the amplifier module outputs the second output signal FB_CC at low level, such that the first output signal FB_CV is larger than the second output signal FB_CC, the third output signal FB_CIC and the fourth output signal FB_DPM. The amplifier module takes the first output signal FB_CV as the first detecting signal $V_{det}$ and outputs it to the compensation circuit 14. The first detecting signal $V_{det}$ is input to the inverting input end of the first error amplifier AMP1 via the second RC network 144, such that the first error amplifier AMP1 outputs a corresponding analog signal.

It is worth mentioning that, at this moment, the first switching unit 140 is electrically connected to the output end of the first error amplifier AMP1 and the voltage output end $V_{EAO}$, but the output end of the first error amplifier AMP1 and the inverting input end of the first error amplifier AMP1 form an open circuit.

On the other hand, the first output signal FB_CV is larger than the second output signal FB_CC, the third output signal FB_CIC and the fourth output signal FB_DPM, so the voltage comparator $CMP_{MODE}$ outputs the second detecting signal CV at high level. The first switch SW_1 is open, and the second resistor R_2 and the first resistor R_1 are conducted. In other words, the change of resistance of the first RC network 141 is the sum of the first resistor R_1 and the second resistor R_2. Accordingly, the compensation circuit 14 can provide different compensation values to the control circuit 11 to speed up the response time of the energy storage device 1.

However, there would be certain problems as the resistance of the first RC network 141 changes. The resistance of the first RC network 141 increases, so the voltage output end $V_{EAO}$ minus the voltage across the first capacitor C_1, the first resistor R_1 and the second resistor R_2 is the first input voltage $V_{in}$ of the inverting input end of the first error amplifier AMP1. Thus, the first input voltage $V_{in}$ of the inverting input end of the first error amplifier AMP1 decreases, and a negative feedback current is generated and flows to the inverting input end of the first error amplifier AMP1 via the first RC network 141, and then the negative feedback current flows to the second RC network 144. As a result, the first error amplifier AMP1 outputs an analog signal at high level, and thus the high-level analog signal again raises up the voltage of the voltage output end $V_{EAO}$, such that the first comparator CMP1 outputs the compensation signal $V_{CP}$ with a high duty cycle. As shown in FIG. 4, in the time duration between the time T1 and the time T2, the voltage of the voltage output end $V_{EAO}$ would dramatically increase and an over shoot may occur.

The control circuit 11 controls the duty cycle of the first transistor Q1 and the second transistor Q2 according to the compensation signal $V_{CP}$, such that the inductor current $I_L$ flowing through the inductor L dramatically increases. The dramatic increase of the inductor current $I_L$ makes the voltage stored in the energy storage unit 12 also dramatically increase, and that as a result, other elements of the energy storage device 1 may be damaged, which influences the voltage provided to the electric device, as shown in FIG. 4.

Likewise, at time T3, the load of the electric device decreases, such that the load current $I_{LOAD}$ decreases and thus the output current $I_{CC}$ increases. At this moment, the first switch SW_1 is open and the second resistor R_2 and the first resistor R_1 are conducted, such that the resistance of the first RC network 141 increases. As a result, the first input voltage $V_{in}$ of the inverting input end of the first error amplifier AMP1 increases, and the first error amplifier outputs an analog signal at low level to the voltage output end $V_{EAO}$. The voltage of the voltage output end $V_{EAO}$ dramatically decreases and an under shoot may occur, such that the first comparator CMP1 outputs the compensation signal $V_{CP}$ having a low duty cycle, which further results in a dramatic decrease of the inductor current $I_L$.

In order to overcome the above situation, after receiving the first detecting signal $V_{det}$ which is an analog signal at much higher level or at much lower level, the logic control module 142 compares the first detecting signal $V_{det}$ with the first reference voltage $V_{REF1}$. Precisely, the logic control module 142 compares the first detecting signal $V_{det}$ with the second reference voltage $V_{REF2}$. The second reference voltage $V_{REF2}$ is 90% of the first reference voltage $V_{REF1}$. The second comparator CMP2 outputs the second comparison signal at high level when the first detecting signal $V_{det}$ is smaller than the second reference voltage $V_{REF2}$, or the second comparator CMP2 outputs the second comparison signal at low level when the first detecting signal $V_{det}$ is not smaller than the second reference voltage $V_{REF2}$.

On the other hand, the logic control module 142 compares the first detecting signal $V_{det}$ with the third reference voltage $V_{REF3}$. The third reference voltage $V_{REF3}$ is 110% of the first reference voltage $V_{REF1}$. The third comparator CMP3 outputs the third comparison signal at high level when the first detecting signal $V_{det}$ is larger than the third reference voltage $V_{REF3}$, or the third comparator CMP3 outputs the third comparison signal at low level when the first detecting signal $V_{det}$ is not larger than the third reference voltage $V_{REF3}$.

The logic controller 1420 determines whether the first detecting signal $V_{det}$ is within 90%~110% of the first reference voltage $V_{REF1}$ according to the second comparison signal and the third comparison signal output by the second comparator CMP2 and the third comparator CMP3. If the first detecting signal $V_{det}$ is within 90%~110% of the first reference voltage $V_{REF1}$, it represents that the difference between the first input voltage $V_{in}$ of the first error amplifier AMP1 and the first reference voltage $V_{REF1}$ would be small, and thus the inductor current $I_L$ would not dramatically change because of the increase of the resistance of the first RC network 141. On the other hand, if the first detecting signal $V_{det}$ is not within 90%~110% of the first reference voltage $V_{REF1}$, it represents that the difference between the first input voltage $V_{in}$ of the first error amplifier AMP1 and the first reference voltage $V_{REF1}$ would be very large, and thus an over shoot or an under shoot may occur due to the too large inductor current $I_L$ as the resistance of the first RC network 141 changes. As a result, the energy storage device cannot work stably.

Figure 5:
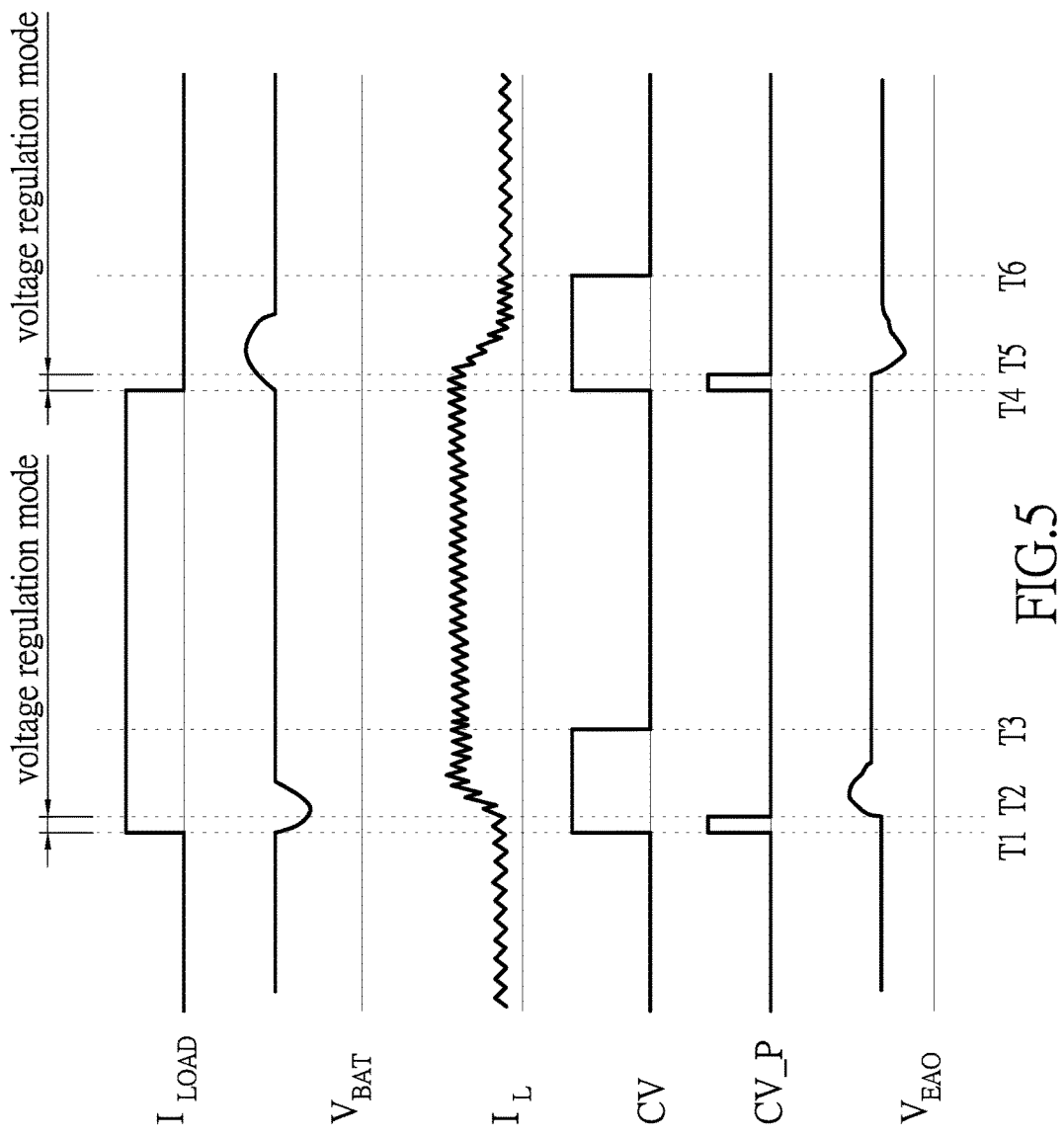
FIG. 5 shows waveform diagrams of the voltage and the current of an energy storage device in the voltage regulation mode of one embodiment of the instant disclosure.

Please refer to FIG. 5. FIG. 5 shows waveform diagrams of the voltage and the current of an energy storage device in the voltage regulation mode of one embodiment of the instant disclosure. Within the time duration between the time T1 and the time T2, the first detecting signal $V_{det}$ is not within 90%~110% of the first reference voltage $V_{REF1}$, and the compensation circuit 14 enters into a voltage regulation mode. At this moment, the logic controller 1420 outputs a logic control signal CV_P to control the first switching unit 140, the second switching unit 145 and the memory unit.

Precisely then, the logic controller 1420 controls the first switching unit 140 to make the output end of the first error amplifier AMP1 and the inverting input end of the first error amplifier AMP1 connected, and to make the output end of the first error amplifier AMP1 and the voltage output end $V_{EAO}$ form an open circuit. After that, the logic controller 1420 controls the second switching unit 145 to make the voltage output end $V_{EAO}$ and the inverting input end of the second error amplifier AMP2 connected via the logic control signal CV_P.

The signal output by the first error amplifier AMP1 is directly fed back to the inverting input end of the first error amplifier AMP1. The voltage of the second end of the first capacitor C_1 would be stably maintained at the first reference voltage $V_{REF1}$.

On the other hand, the logic controller 1420 controls the memory unit 1430 to provide a preset output voltage to the second error amplifier AMP2 via the logic control signal CV_P, such that the second error amplifier AMP2 outputs analog signal to the voltage output end $V_{EAO}$. In other words, the voltage of the voltage output end $V_{EAO}$ would be regulated, and the voltage of the voltage output end $V_{EAO}$ is the voltage of the voltage output end $V_{EAO}$ before the detection circuit 13 outputs the first detecting signal $V_{det}$. Accordingly, the voltage of the first end of the first capacitor C_1 would be also be stably regulated.

The voltages of two ends of the first capacitor C_1 is locked, so there would not be the negative feedback current flowing to the inverting input end of the first error amplifier AMP1 via the first RC network 141. Thus, an over shoot or an under shoot would not occur in the energy storage device 1, and thus the inductor current $I_L$ would not be too large or too small for the energy storage device 1 to work stably.

Within the time duration between the timing T2 and the timing T3, the logic controller 1420 controls the first switching unit 140 to make the output end of the first error amplifier AMP1 and the voltage output end $V_{EAO}$ connected, and to make the output end of the first error amplifier AMP1 and the inverting input end of the first error amplifier AMP1 form an open circuit. On the other hand, the logic controller 1420 controls the memory unit 1430 to stop providing the preset output voltage.

Moreover, the logic controller 1420 further controls the second switching unit 145 to make the voltage output end $V_{EAO}$ and the second error amplifier AMP2 form an open circuit. The second error amplifier AMP2 stops transmitting the analog signals to the voltage output end $V_{EAO}$. Additionally, the output voltage amplifier AMP$_{CV}$ outputs the first detecting signal $V_{det}$, which is analog, such that the compensation circuit 14 works normally due to the feedback mechanism so as to provide the compensation signal $V_{CP}$ to the control circuit 11.

At time T4, the load of the electric device 2 decreases, so the load current $I_{LOAD}$ decreases. The voltage comparator CMP$_{MODE}$ again outputs the second detecting signal CV at high level to the compensation circuit 14, such that the compensation circuit 14 enters into the voltage regulation mode. After that, within the time duration between the time T4 and the time T5, the logic controller 1420 stabilizes the voltage of the inverting input end of the first error amplifier AMP1 and the voltage output end $V_{EAO}$ according to the above description, so as to make the voltage of two ends of the first capacitor C_1 stable.

At the time T5, the compensation circuit 14 leaves the voltage regulation mode. Within the time duration between the time T5 and the time T6, the control circuit 11 correspondingly decreases the inductor current $I_L$ according to the compensation signal $V_{CP}$. In addition, the time duration when the compensation circuit 14 works in the voltage regulation mode is 4~5 μs.

The difference between the energy storage device provided by the instant disclosure and the traditional energy storage device is that, the energy storage device provided by the instant disclosure can provide different compensation values. Also, when changing the compensation values, the energy storage device provided by the instant disclosure also can stabilize the voltage of the first capacitor C_1. On the contrary, the traditional energy storage device can only provide the constant compensation value.

It should be noted that, in this embodiment, the compensation circuit 14 makes the first switch SW_1 open when the second detecting signal CV output by the voltage comparator CMP$_{MODE}$ turns to be at high level, so as to change the compensation value. The compensation circuit 14 would not make the first switch SW_1 open when a third detecting signal CC, a fourth detecting signal CIC or a fifth detecting signal DPM output by the voltage comparator CMP$_{MODE}$ turns to be at high level. Thus, the sensing loops respectively formed by the output current amplifier AMP$_{CC}$, the input current amplifier AMP$_{CIC}$ and the input voltage amplifier AMP$_{DPM}$ have the same compensation value, wherein the logic levels of the third detecting signal CC, the fourth detecting signal CIC and the fifth detecting signal DPM are respectively related to the second output signal FB_CC, the third output signal FB_CIC and the fourth output signal FB_DPM; however, it is not limited herein. In other embodiments, the compensation circuit 14 can also change the compensation value when the third detecting signal CC, the fourth detecting signal CIC or the fifth detecting signal DPM output by the voltage comparator CMP$_{MODE}$ turns to be at high level.

In addition, the above mentioned structures of the detection circuit 13 and the compensation circuit 14 are for illustrating the instant disclosure, but not for limiting the instant disclosure. By referring to the disclosure herein, those skilled in the art should be able to design the connecting relationships for the inverting input end and the non-inverting input end of the first error amplifier AMP1, the second error amplifier AMP2, the first comparator CMP1, the second comparator CMP2, the third comparator CMP3, and other comparators.

Figure 6:
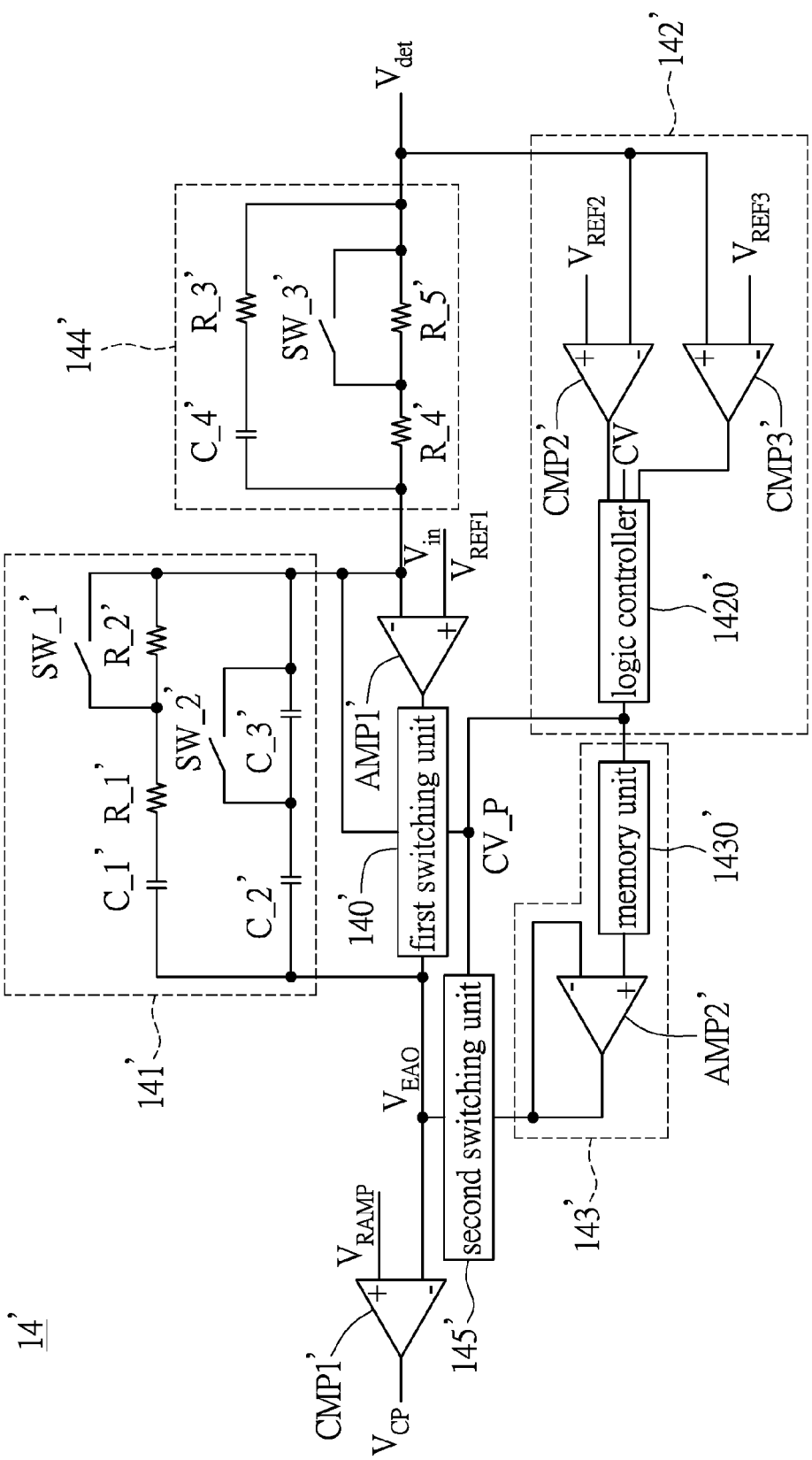
FIG. 6 shows a schematic diagram of a compensation circuit of another embodiment of the instant disclosure.

Please refer to FIG. 6, FIG. 6 shows a schematic diagram of a compensation circuit of another embodiment of the instant disclosure. The compensation circuit 14' comprises a first error amplifier AMP1', a first switching unit 140', a second switching unit 145', a first RC network 141', a logic control module 142', a voltage recording module 143', a second RC network 144' and a first comparator CMP1'. The logic control module 142' comprises a second comparator CMP2', a third comparator CMP3' and a logic controller 1420'. The voltage recording module 143' comprises a second error amplifier AMP2' and a memory unit 1430'. The connecting relationships of the above elements are similar to the compensation circuit 14 shown in FIG. 3, and thus the information is not repeated here.

The difference between the compensation circuit 14' shown in FIG. 6 and the compensation circuit 14 shown in FIG. 3 is that, in addition to a first capacitor C_1', a first resistor R_1', a second resistor R_2' and a first switch SW_1', the first RC network 141' also comprises a second capacitor C_2', a third capacitor C_3' and a second switch SW_2'. One end of the second capacitor C_2' is electrically connected to the first capacitor C_1' and the voltage output end $V_{EAO}$. Another end of the second capacitor C_2' is electrically connected to the third capacitor C_3'. The third capacitor C_3' is electrically connected to the second resistor R_2' and the inverting input end of the first error amplifier AMP1'. The second switch SW_2' is electrically connected to two ends of the third capacitor C_3'.

Moreover, in addition to a fourth capacitor C_4', a third resistor R_3', a fourth resistor R_4' and a fifth resistor R_5', the second RC network 144' also comprises a third switch SW_3'. The third switch SW_3' is electrically connected to two ends of the fifth resistor R_5'.

After the compensation circuit 14' enters in the voltage regulation mode, the first switch SW_1' is open to conduct the second resistor R_2'. The second switch SW_2' is open to conduct the third capacitor C_3'. The third switch SW_3' is closed to form a short circuit with the fifth resistor R_5'. Thereby, the compensation circuit 14' can provide different compensation values to the control circuit (not shown in FIG. 6)

Moreover, in other embodiments, the compensation circuit 14' may not have the second switch SW_2', or the second RC network 144' may not have the third switch SW_3'. That is, those skilled in the art can design the first RC network 141' and the second RC network 144' depending on needs, such that the compensation circuit 14' can provide different compensation values.

It is worth mentioning that, in this embodiment, the compensation circuit 14' makes the first switch SW_1' open, the second switch SW_2' open, and the third switch SW_3' closed when the voltage comparator (as the voltage comparator shown in FIG. 2B) outputs the second detecting signal CV at high level. In other embodiments, the compensation circuit 14' controls the first switch SW_1', the second switch SW_2' and the third switch SW_3' to be open or closed when the third detecting signal CC, the fourth detecting signal CIC or the fifth detecting signal DPM output by the voltage comparator $CMP_{MODE}$ turns to be at high level, such that the sensing loops respectively formed by the output current amplifier $AMP_{CC}$, the input current amplifier $AMP_{CIC}$ and the input voltage amplifier $AMP_{DPM}$ have different compensation values.

To sum up, the compensation circuit and the energy storage device using the same provided by the instant disclosure can provide different compensation values via changing the resistance or the capacitance in the compensation circuit. The response time of the energy storage device can be shortened because of the change of the compensation value, such that the loading change of the electric device can respond quickly.

In addition, in the instant disclosure, the voltage of the capacitor of the compensation circuit is stabilized via the driving ability of the amplifier, such that the surges generated when the compensation circuit changes the compensation value can disappear. Thereby, the energy storage unit of the energy storage device can stably provide the energy to the elements of the energy storage device.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A compensation circuit, used in an energy storage device, the energy storage device configured to charge an electric device, the compensation circuit comprising:
   a first error amplifier, having a first input end electrically connected to a detection circuit, wherein the detection circuit detects a plurality of sensing loops of the electric device;
   a first switching unit, electrically connected to an output end of the first error amplifier, the first input end of the first error amplifier and a voltage output end, to selectively make the output end of the first error amplifier, the first input end of the first error amplifier and the voltage output end connected;
   a first RC network, electrically connected to the first input end of the first error amplifier and the voltage output end, wherein the first RC network comprises a first capacitor, and the resistance or the capacitance of the first RC network changes with different sensing loops to change a compensation value of the compensation circuit;
   a voltage recording module, electrically connected to the voltage output end, to provide a preset output voltage;
   a second switching unit, electrically connected between the voltage output end and the voltage recording module, to selectively make the voltage output end and the voltage recording module connected; and
   a logic control module, electrically connected to the first switching unit, the second switching unit and the voltage recording module;
   wherein the detection circuit outputs a detecting signal as the sensing loop changes, such that the logic control module controls the first switching unit to make the first input end of the first error amplifier and the output end of the first error amplifier connected and controls the second switching unit to make the voltage output end and the voltage recording module connected according to the detecting signal, and the voltage recording module outputs the preset output voltage to the voltage output end to stabilize the voltage of the first capacitor;
   wherein after receiving the detecting signal, the compensation circuit switches to a voltage regulation mode, and the voltage output by the first error amplifier is fed back to the first input end of the first error amplifier, such that the voltage difference between a first input voltage of the first input end and a first reference voltage received by a second input end of the first error amplifier is within a preset range.

2. The compensation circuit according to claim 1, wherein the preset range is between 90%~110% of the first reference voltage.

3. The compensation circuit according to claim 1, wherein the voltage recording module comprises:
   a second error amplifier, having a first input end and an output end electrically connected together, the output end of the second error amplifier further electrically connected to the second switching unit; and
   a memory unit, electrically connected to a second input end of the second error amplifier to store the preset output voltage.

4. The compensation circuit according to claim 1, further comprising:
   a second RC network, electrically connected to the first input end of the first error amplifier and the detection circuit, to convert the detecting signal into the first input voltage, wherein the resistance or the capacitance of the second RC network changes with different sensing loops.

5. The compensation circuit according to claim 1, wherein the first RC network further comprises:
   a first resistor, electrically connected to the first capacitor;
   a second resistor, electrically connected to the first resistor and the first input end of the first error amplifier; and
   a first switch, electrically connected to two ends of the second resistor;
   wherein after receiving the detecting signal, the first switch is open to conduct the second resistor.

6. The compensation circuit according to claim 1, wherein the first RC network further comprises:
   a second capacitor, electrically connected to the first capacitor;
   a third capacitor, electrically connected to the second capacitor and the first input end of the first error amplifier, wherein the second capacitor and the third capacitor are connected to the first capacitor, the first resistor and the second resistor in parallel; and
   a second switch, electrically connected to two ends of the third capacitor;
   wherein after receiving the detecting signal, the second switch is open to conduct the third capacitor.

7. The compensation circuit according to claim 1, further comprising:

a first comparator, having a first input end receiving a ramp signal, a second input end electrically connected to the voltage output end, wherein the first comparator outputs a compensation signal to a control circuit according to the ramp signal and the voltage of the voltage output end, such that the control circuit adjusts the energy provided to the electric device.

8. The compensation circuit according to claim 1, wherein the logic control module comprises:
    a second comparator, having a first input end receiving a second reference voltage and a second input end electrically connected to the detection circuit;
    a third comparator, having a first input end electrically connected to the detection circuit and a second input end receiving a third reference voltage; and
    a logic controller, electrically connected to the output ends of the second comparator and the third comparator, the first switching unit, the second switching unit, the detection circuit and the voltage recording module, to control the switching unit and the voltage recording module.

9. The compensation circuit according to claim 8, wherein the second reference voltage is 90% of the first reference voltage and the third reference voltage is 110% of the first reference voltage.

10. The compensation circuit according to claim 1, wherein the detection circuit detects an output voltage or an output current provided by an energy storage unit of the energy storage device, or detects an input voltage or an input current provided by a transformer of the energy storage device via the sensing loops, to output a detecting signal.

11. An energy storage device, used to charge an electric device, the energy storage device comprising:
    a detection circuit, detecting a plurality of sensing loops and determining different sensing loops;
    an energy storage unit, electrically connected to the detection circuit, to store energy or provide energy; and
    a compensation circuit, electrically connected to the detection circuit, to provide a compensation value, the compensation circuit comprising:
        a first error amplifier, having a first input end electrically connected to the detection circuit;
        a first switching unit, electrically connected to an output end of the first error amplifier, the first input end of the first error amplifier and the voltage output end, to selectively make the output end of the first error amplifier, the first input end of the first error amplifier and the voltage output end connected;
        a first RC network, electrically connected to the first input end of the first error amplifier and the voltage output end, wherein the first RC network comprises a first capacitor, and the resistance or the capacitance of the first RC network changes with different sensing loops to change a compensation value of the compensation circuit;
        a voltage recording module, electrically connected to the voltage output end, to provide a preset output voltage;
        a second switching unit, electrically connected between the voltage output end and the voltage recording module, to selectively make the voltage output end and the voltage recording module connected; and
        a logic control module, electrically connected to the first switching unit, the second switching unit and the voltage recording module;
    wherein the detection circuit outputs a detecting signal as the sensing loop changes, such that the logic control module controls the first switching unit to make the first input end of the first error amplifier and the output end of the first error amplifier connected and controls the second switching unit to make the voltage output end and the voltage recording module connected according to the detecting signal, and the voltage recording module outputs the preset output voltage to the voltage output end to stabilize the voltage of the first capacitor;
    wherein after receiving the detecting signal, the compensation circuit switches to a voltage regulation mode, and the voltage output by the first error amplifier is fed back to the first input end of the first error amplifier, such that the voltage difference between a first input voltage of the first input end and a first reference voltage received by a second input end of the first error amplifier is within a preset range.

12. The energy storage device according to claim 11, wherein the preset range is between 90%~110% of the first reference voltage.

13. The energy storage device according to claim 11, wherein the voltage recording module comprises:
    a second error amplifier, having a first input end and an output end electrically connected together, the output end of the second error amplifier further electrically connected to the second switching unit; and
    a memory unit, electrically connected to a second input end of the second error amplifier to store the preset output voltage.

14. The energy storage device according to claim 11, wherein the compensation circuit further comprises:
    a second RC network, electrically connected to the first input end of the first error amplifier and the detection circuit, to convert the detecting signal into the first input voltage, wherein the resistance or the capacitance of the second RC network changes with different sensing loops.

15. The energy storage device according to claim 11, wherein the first RC network further comprises:
    a first resistor, electrically connected to the first capacitor;
    a second resistor, electrically connected to the first resistor and the first input end of the first error amplifier; and
    a first switch, electrically connected to two ends of the second resistor;
    wherein after receiving the detecting signal, the first switch is open to conduct the second resistor.

16. The energy storage device according to claim 15, wherein the first RC network further comprises:
    a second capacitor, electrically connected to the first capacitor;
    a third capacitor, electrically connected to the second capacitor and the first input end of the first error amplifier, wherein the second capacitor and the third capacitor are connected to the first capacitor, the first resistor and the second resistor in parallel; and
    a second switch, electrically connected to two ends of the third capacitor;
    wherein after receiving the detecting signal, the second switch is open to conduct the third capacitor.

17. The energy storage device according to claim 11, wherein the compensation circuit further comprises:
    a first comparator, having a first input end receiving a ramp signal, a second input end electrically connected to the voltage output end, wherein the first comparator outputs a compensation signal to a control circuit according to the ramp signal and the voltage of the voltage output end, such that the control circuit adjusts the energy provided to the electric device.

18. The energy storage device according to claim 11, wherein the logic control module comprises:
- a second comparator, having a first input end receiving a second reference voltage and a second input end electrically connected to the detection circuit;
- a third comparator, having a first input end electrically connected to the detection circuit and a second input end receiving a third reference voltage; and
- a logic controller, electrically connected to the output ends of the second comparator and the third comparator, the first switching unit, the second switching unit, the detection circuit and the voltage recording module, to control the switching unit and the voltage recording module.

19. The energy storage device according to claim 18, wherein the second reference voltage is 90% of the first reference voltage and the third reference voltage is 110% of the first reference voltage.

20. The energy storage device according to claim 11, wherein the detection circuit detects an output voltage or an output current provided by an energy storage unit of the energy storage device, or detects an input voltage or an input current provided by a transformer of the energy storage device via the sensing loops, to output a detecting signal.

\* \* \* \* \*